United States Patent
Akagami

(10) Patent No.: US 11,233,695 B2
(45) Date of Patent: Jan. 25, 2022

(54) COMMUNICATION TERMINAL, COMMUNICATION SYSTEM, COMMUNICATION TERMINAL CONTROL METHOD, AND PROGRAM

(71) Applicant: NEC Corporation, Tokyo (JP)

(72) Inventor: Terumichi Akagami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 202 days.

(21) Appl. No.: 16/495,747

(22) PCT Filed: Feb. 23, 2018

(86) PCT No.: PCT/JP2018/006715
§ 371 (c)(1),
(2) Date: Sep. 19, 2019

(87) PCT Pub. No.: WO2018/173627
PCT Pub. Date: Sep. 27, 2018

(65) Prior Publication Data
US 2020/0028732 A1    Jan. 23, 2020

(30) Foreign Application Priority Data

Mar. 23, 2017    (JP) .............................. JP2017-056929

(51) Int. Cl.
*H04L 12/24* (2006.01)
*H04L 29/06* (2006.01)

(52) U.S. Cl.
CPC .......... *H04L 41/0668* (2013.01); *H04L 63/08* (2013.01)

(58) Field of Classification Search
CPC .... H04L 41/0668; H04L 63/08; H04W 28/02; H04W 40/22; H04W 12/06
(Continued)

(56) References Cited

U.S. PATENT DOCUMENTS

| 2010/0136983 | A1* | 6/2010 | Lu | H04W 40/22 455/446 |
| 2013/0083722 | A1* | 4/2013 | Bhargava | H04W 72/085 370/315 |
| 2018/0199262 | A1* | 7/2018 | Kuge | H04W 76/14 |

FOREIGN PATENT DOCUMENTS

| JP | 2009-159512 A | 7/2009 |
| JP | 2010-63022 A | 3/2010 |

(Continued)

OTHER PUBLICATIONS

International Search Report of PCT/JP2018/006715 dated May 1, 2018.

(Continued)

*Primary Examiner* — Kwang B Yao
*Assistant Examiner* — Syed M Bokhari

(57) ABSTRACT

A communication terminal including: a first normal operation determination unit determines whether an external communication network relay device is operating normally; a terminal selection unit selects a substitute communication terminal for executing a first substitute process for the external communication network relay device; a first instruction unit, when the own communication terminal is selected, instructs an internal wireless communication network relay device to perform processes of relaying a connection information allocation request and a response to the allocation request between the requesting communication terminal and the own communication terminal, relaying data relating to authentication between the own communication terminal and the authentication device, and relaying data for the external communication network to the external communication network; and a second instruction unit instructs a bypassing relay device to perform a process for relaying the data relating to authentication between the internal (Continued)

wireless communication network relay device and the authentication device.

5 Claims, 9 Drawing Sheets

(58) Field of Classification Search
USPC .................................................. 370/221, 315
See application file for complete search history.

(56) References Cited

FOREIGN PATENT DOCUMENTS

| | | |
|---|---|---|
| JP | 2014-138248 A | 7/2014 |
| JP | 2014-239469 A | 12/2014 |
| JP | 2016-063237 A | 4/2016 |
| JP | 2016-531494 A | 10/2016 |

OTHER PUBLICATIONS

Notice of Reasons for Refusal dated May 12, 2020, from the Japanese Patent Office in Application No. 2019-507470.

* cited by examiner

COMMUNICATION TERMINAL, COMMUNICATION SYSTEM, COMMUNICATION TERMINAL CONTROL METHOD, AND PROGRAM

CROSS REFERENCE TO RELATED APPLICATIONS

This application is a National Stage of International Application No. PCT/JP2018/006715 filed Feb. 23, 2018, claiming priority based on Japanese Patent Application No. 2017-056929 filed Mar. 23, 2017, the contents of which are incorporated herein by reference.

TECHNICAL FIELD

The present invention relates to a communication terminal, a communication system, a communication terminal control method and a program.

BACKGROUND ART

Technologies for providing continual communication services even when a malfunction occurs in a mobile communication system are known.

Patent Document 1 describes a technology wherein, when a malfunction occurs in a P-CSCF (Proxy-Call Session Control Function) that is a first access point of a terminal and that manages terminal information, the terminal registers the terminal information in a P-CSCF different from the first P-CSCF.

Patent Document 2 describes a technology, in an SAE (System Architecture Evolution) type mobile communication system, wherein transmission processing and reception processing of communications using PCC control (Policy and Charging Control) is performed even if a malfunction occurs in a PCRF (Policy and Charging Rules Function) for determining policy control or billing control rules.

Patent Document 3 describes a technology that provides continual telephone connection service while limiting communication costs. In the technology described in Patent Document 3, when there is an IP (Internet Protocol) path malfunction between a transmission-side node and a reception-side node, the transmission-side node bypasses a public network and selects the relay node that minimizes the cost. Furthermore, the transmission-side node establishes a communication route to the selected relay node. The relay node establishes communication to the reception-side node by bypassing the public network.

CITATION LIST

Patent Literature

[Patent Document 1]
Japanese Unexamined Patent Application, First Publication No. 2016-063237
[Patent Document 2]
Japanese Unexamined Patent Application, First Publication No. 2014-239469
[Patent Document 3]
Japanese Unexamined Patent Application, First Publication No. 2009-159512

SUMMARY OF INVENTION

Problems to be Solved by the Invention

When a malfunction occurs in a communication system due to a disaster or the like, there may be cases in which communication is not possible between a base station and an authentication device. In a communication system under such a condition, the sequence will stop at the authentication stage for new terminals. For this reason, terminals in which authentication has not been completed before the occurrence of the malfunction will not be able to carry out data communications.

In response thereto, Patent Document 1, Patent Document 2 and Patent Document 3 describe measures to be taken when a malfunction occurs in a communication system, but they do not describe measures to be taken when it is not possible to communicate with an authentication device due to the malfunction. In other words, the technologies described in Patent Document 1, Patent Document 2 and Patent Document 3 have the problem that new terminals cannot carry out data communications when a malfunction occurring in a communication system makes it impossible to communicate with an authentication device.

An object of the present invention is to provide a communication terminal, a communication system, a communication terminal control method and a program that solve the abovementioned problem.

Means for Solving the Problems

According to a first aspect of the present invention, a communication terminal comprises: a first normal operation determination unit configured to determine whether or not an external communication network relay device, which requests an authentication device to authenticate communication terminals, is operating normally; a terminal selection unit configured to, when the first normal operation determination unit determines that the external communication network relay device is not operating normally, select, from among a plurality of communication terminals including the own communication terminal, a substitute communication terminal for executing a first substitute process for the external communication network relay device; a first instruction unit configured to, when the own communication terminal is selected as the substitute communication terminal, instruct an internal wireless communication network relay device, which is a relay destination for data from the plurality of communication terminals, to perform processes of relaying a connection information allocation request from a requesting communication terminal and a response to the allocation request between the requesting communication terminal and the own communication terminal, relaying data relating to authentication of the requesting communication terminal between the own communication terminal and the authentication device, and relaying data for the external communication network from the requesting communication terminal to the external communication network via the own communication terminal; and a second instruction unit configured to instruct a bypassing relay device that relays the data for the external communication network between the internal wireless communication network relay device and the external communication network to further perform a process for relaying the data relating to authentication between the internal wireless communication network relay device and the authentication device.

According to a second aspect of the present invention, a communication system comprises: a plurality of communication terminals; an internal wireless communication network relay device, which is a relay destination for data from the plurality of communication terminals; an external communication network relay device configured to, when a connection information allocation request is received from a requesting communication terminal via the internal wireless communication network relay device, request an authentication device to authenticate the requesting communication terminal, allocate the connection information to the authenticated requesting communication terminal, and transmit the allocated connection information to the authenticated requesting communication terminal via the internal wireless communication network relay device; and a bypassing relay device configured to relay data for the external communication network, from the requesting communication terminal that used the allocated connection information, between the internal wireless communication network relay device and the external communication network; wherein at least one of the plurality of communication terminals is the above-described communication terminal.

According to a third aspect of the present invention, a communication terminal control method comprises steps of: determining whether or not an external communication network relay device, which requests an authentication device to authenticate communication terminals, is operating normally; when it is determined that the external communication network relay device is not operating normally, selecting, from among a plurality of communication terminals including the own communication terminal, a substitute communication terminal for executing a first substitute process for the external communication network relay device; when the own communication terminal is selected as the substitute communication terminal, instructing an internal wireless communication network relay device, which is a relay destination for the plurality of communication terminals, to perform processes of relaying a connection information allocation request from a requesting communication terminal and a response to the allocation request between the requesting communication terminal and the own communication terminal, relaying data relating to authentication of the requesting communication terminal between the own communication terminal and the authentication device, and relaying data for the external communication network from the requesting communication terminal to the external communication network via the own communication terminal; and instructing a bypassing relay device that relays the data for the external communication network between the internal wireless communication network relay device and the external communication network to further perform a process for relaying the data relating to authentication between the internal wireless communication network relay device and the authentication device.

According to a fourth aspect of the present invention, a program makes a computer perform processes of: determining whether or not an external communication network relay device, which requests an authentication device to authenticate communication terminals, is operating normally; when it is determined that the external communication network relay device is not operating normally, selecting, from among a plurality of communication terminals including the own communication terminal, a substitute communication terminal for executing a first substitute process for the external communication network relay device; when the own communication terminal is selected as the substitute communication terminal, instructing an internal wireless communication network relay device, which is a relay destination for the plurality of communication terminals, to perform processes of relaying a connection information allocation request from a requesting communication terminal and a response to the allocation request between the requesting communication terminal and the own communication terminal, relaying data relating to authentication of the requesting communication terminal between the own communication terminal and the authentication device, and relaying data for the external communication network from the requesting communication terminal to the external communication network via the own communication terminal; and instructing a bypassing relay device that relays the data for the external communication network between the internal wireless communication network relay device and the external communication network to further perform a process for relaying the data relating to authentication between the internal wireless communication network relay device and the authentication device.

Advantageous Effects of Invention

According to at least one of the above-described aspects, a communication terminal is able to authenticate and carry out data communications with new terminals even when a malfunction occurs and an authentication device cannot be used for authentication.

DESCRIPTION OF EMBODIMENTS

Hereinafter, embodiments of the present invention will be explained in detail with reference to the drawings.

Figure 1:
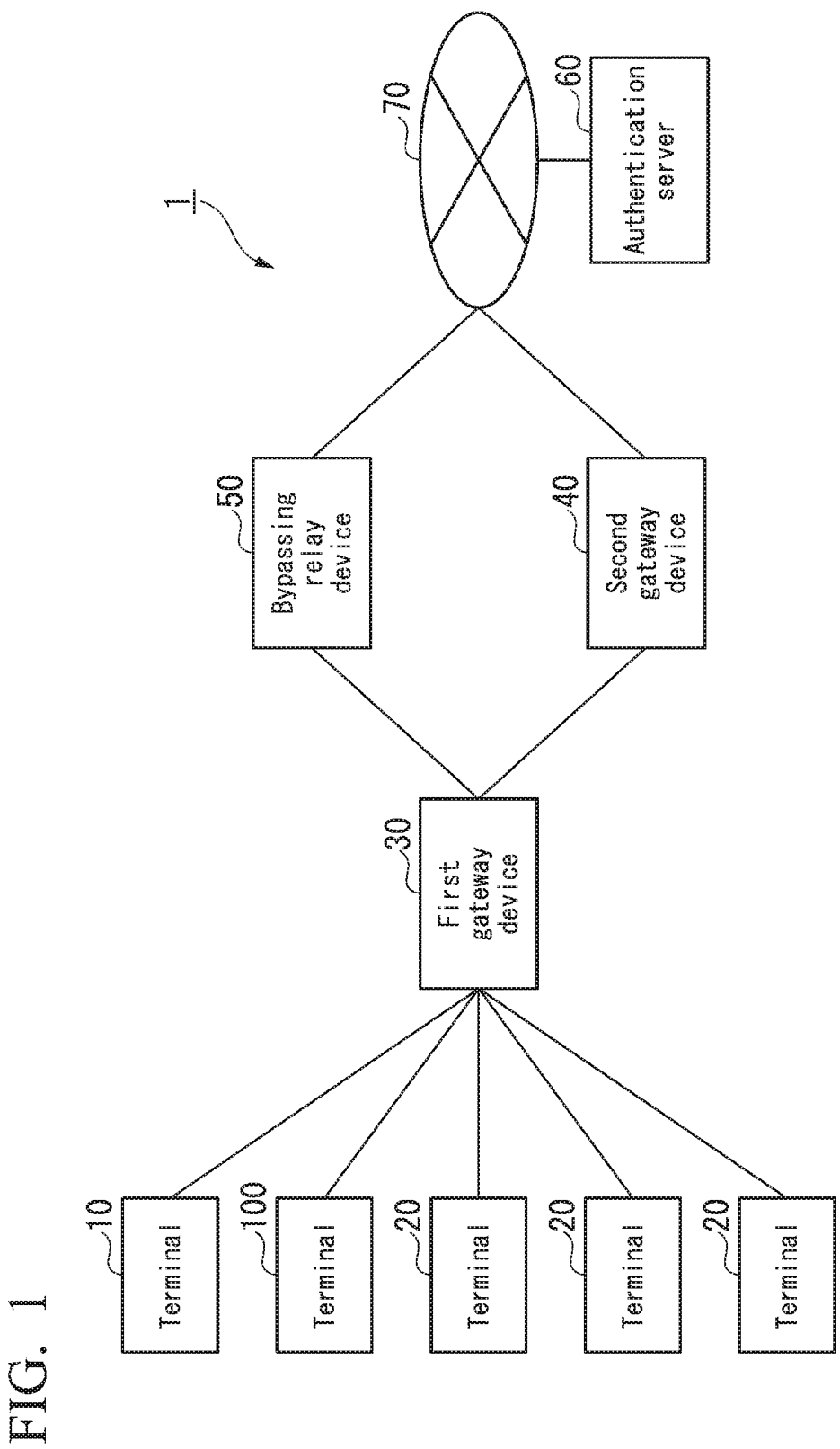
FIG. 1 is a diagram illustrating the structure of a communication system according to one embodiment.

FIG. 1 is a diagram illustrating the structure of a communication system according to one embodiment.

The communication system 1 comprises a terminal 10, plurality of terminals 20, a terminal 100, a first gateway device 30, a second gateway device 40, a bypassing relay device 50, an authentication server 60 and an external communication network 70.

The terminal 10 is a communication terminal such as, for example, a so-called smartphone terminal, a cellular telephone terminal or the like. When a malfunction occurs in at least one of the second gateway device 40 and the authentication server 60, the terminal 10 performs a predetermined process so as to allow a new terminal 100 to access the external communication network 70.

The terminals 20 and 100 are terminals having functions similar to those of the terminal 10. For this reason, both the terminals 20 and 100 can function as terminals 10.

The first gateway device 30 functions as an S-GW (serving gateway) and an MME (mobility management entity). The first gateway device 30 manages tasks such as registering the positions of the terminals 10, 20 and 100, issuing calls, and performing handover between base stations, as well as relaying data.

Normally, for connection information allocation requests and responses to said allocation requests, the first gateway device 30 relays the allocation requests between the terminal (e.g., the terminal 100) that made the allocation request and the second gateway device 40. The expression "normally" refers to cases in which there are no malfunctions in the communication system 1. The connection information includes an IP address, a DNS (Doman Name System) address or the like. Additionally, the first gateway device 30 relays data for the external communication network from the terminal 100 that made the connection information allocation request via the second gateway device 40 and through the bypassing relay device 50.

When a malfunction occurs in the second gateway device 40 or the like, the first gateway device 30 appropriately switches the data relay path in accordance with an instruction from the terminal 10.

The second gateway device 40 functions as a P-GW (Packet Data Network Gateway) and serves as a connection point to the external communication network 70. Upon receiving a connection information allocation request, for example, from the terminal 100, via the first gateway device 30, the second gateway device 40 requests that the authentication server 60 authenticate the terminal 100. The authentication is a verification as to whether or not the terminal 100 may be connected to the external communication network 70.

When the terminal 100 is authenticated as being connectable to the external communication network 70, the second gateway device 40 allocates connection information to the terminal 100 and transmits the connection information to the terminal 100 via the first gateway device 30. Additionally, when the terminal 100 attempts to connect to the external communication network 70, the second gateway device 40 converts local IP addresses to global IP addresses (NAT (Network Address Translation)).

Normally, after an arbitrary terminal (e.g., the terminal 100) has been authenticated, the bypassing relay device 50 allows data communications between the terminal 10 and the external communication network 70 by bypassing the second gateway device 40. Specifically, for example, after the terminal 100 has been authenticated, the bypassing relay device 50 relays data for the external communication network between the first gateway device 30 and the external communication network 70.

Additionally, the bypassing relay device 50 can switch the data relay path in accordance with instructions from the terminal 10 when a malfunction occurs in the second gateway device 40 or the like. For example, when the terminal 10, which is a substitute device for the second gateway device 40, requests authentication by the authentication server 60, the bypassing relay device 50 relays data relating to authentication between the first gateway device 30 and the external communication network 70.

In response to the request from the second gateway device 40, the authentication server 60 authenticates whether or not, for example, the terminal 100 may be connected to the external communication network 70. The authentication server 60 also responds to authentication requests from the terminal 10 when a malfunction occurs in the second gateway device 40 and the terminal 10 performs substitute processes for the second gateway device 40.

The external communication network 70 provides IP services, which are core services, to terminals (e.g., the terminal 100) which request connection.

Figure 2:
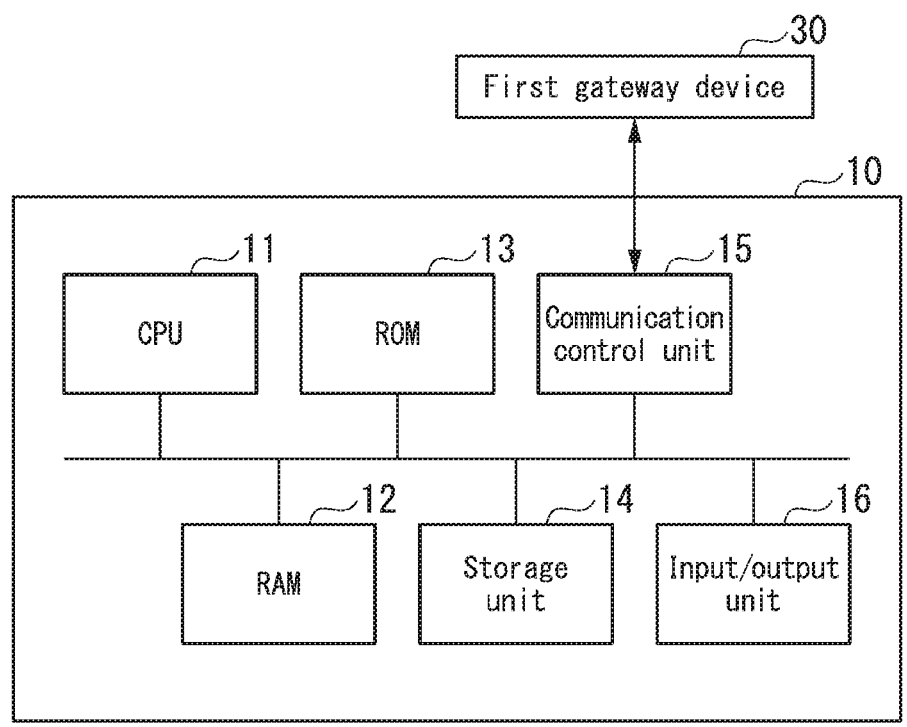
FIG. 2 is a schematic block diagram illustrating the structure of a terminal according to one embodiment.

FIG. 2 is a schematic block diagram illustrating the structure of a terminal according to one embodiment.

The terminal 10 comprises a CPU 11, a RAM 12, a ROM 13, a storage unit 14, a communication control unit 15 and an input/output unit 16.

The CPU 11 is a computation control processor that executes prescribed processes in accordance with programs stored in the ROM 13. For example, the CPU 11 performs processes for carrying out data communications, instructing the first gateway device 30 or the bypassing relay device 50 to switch the relay path, and exchanging information regarding terminal capabilities with the other terminals 20 and 100. Additionally, the CPU 11 also executes processing of selection of the most appropriate terminal as a substitute device for the second gateway device 40 or the authentication server 60, and processing as a substitution device, based on the remaining battery levels, the radio signal states and the like.

The RAM 12 loads data received from an external source and data read from the ROM 13 or the storage unit 14 and is used by the CPU 11 as a work area for the data. The ROM 13 stores initial data and programs and the like for execution by the CPU 11.

The storage unit 14 stores databases, various parameters, application programs, communication control programs for overall control, and the newest conditions and the like for information used when serving as a substitute device. The communication control unit 15 performs data communications with the first gateway device 30. The input/output unit 16 is, for example, a so-called touch panel, a speaker, operation buttons, an infrared communication unit or the like.

The communication system 1 formed as indicated above performs data communications in the following manner.

Figure 3:
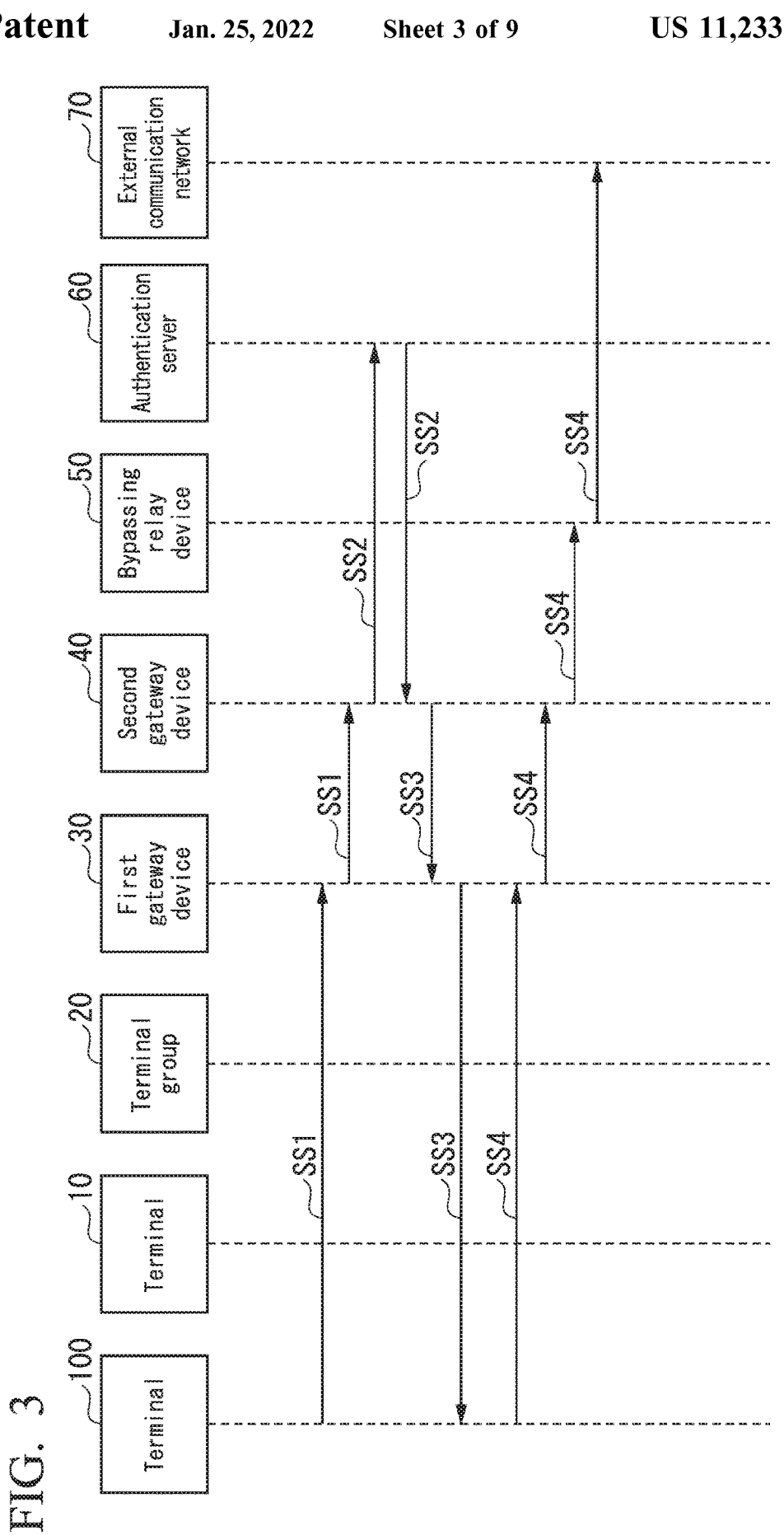
FIG. 3 is a diagram illustrating the flow of a communication procedure during a normal situation in a communication system.

FIG. 3 is a diagram illustrating the flow of a communication procedure during a normal situation in the communication system.

When the terminal 100 is newly incorporated into the communication system 1 by turning on a power supply or the like, data communications are initiated in accordance with the following procedure.

The terminal 100 requests the second gateway device 40, via the first gateway device 30, to allocate connection information (IP address, DNS address and the like) to the external communication network 70 (session SS1).

Upon receiving the connection information allocation request from the terminal 100, the second gateway device 40 starts communicating with the authentication server 60 via the external communication network 70. The second gateway device 40 confirms that the terminal 100 is a terminal that may be connected to the external communication network 70 (session SS2).

Upon obtaining authentication indicating that the terminal 100 is a terminal that may be connected to the external communication network 70, the second gateway device 40 allocates, to the terminal 100, connection information such as an IP address, a DNS address or the like to be used when the terminal 100 connects to the external communication network 70. The second gateway device 40 notifies the terminal 100 of the allocated IP address or the like via the first gateway device 30 (session SS3).

The terminal 100 uses the received IP address or the like to connect to the external communication network 70 via the first gateway device 30, the second gateway device 40 and the bypassing relay device 50 (session SS4). As a result thereof, the terminal 10 is able to carry out data communications with the external communication network 70.

Figure 4:
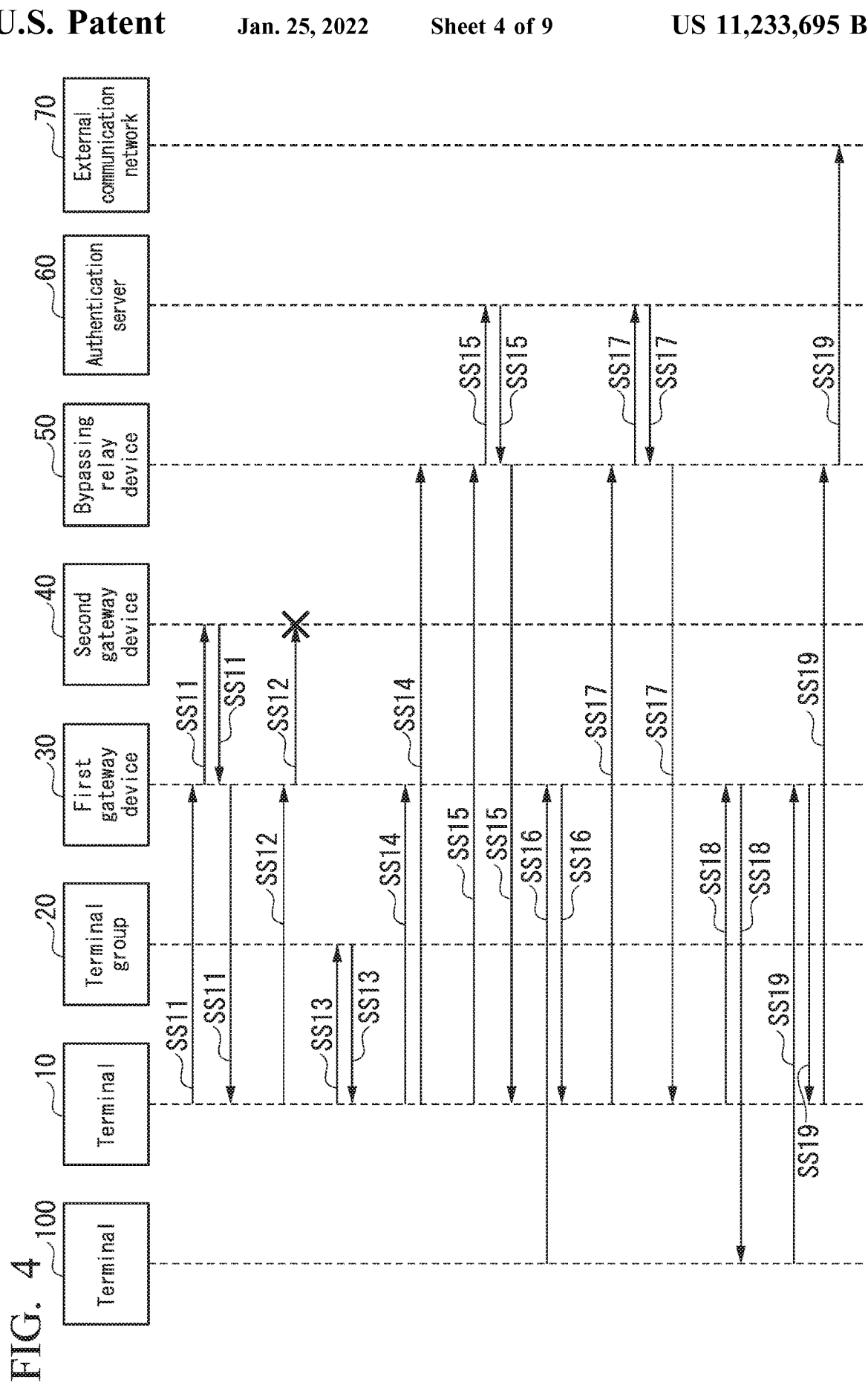
FIG. 4 is a diagram illustrating the flow of a communication procedure when a malfunction occurs in a second gateway device in a communication system.

FIG. 4 is a diagram illustrating the flow of a communication procedure when a malfunction occurs in the second gateway device in the communication system.

The terminal 10 communicates with the second gateway device 40 via the first gateway device 30 and obtains the newest conditions for information used when executing substitution processes for the second gateway device 40 (session SS11).

The terminal 10 confirms the normality, which indicates whether or not the second gateway device 40 is operating normally, via the first gateway device 30. Specifically, the terminal 10 sends a prescribed inquiry to the second gateway device 40 and confirms whether or not a response indicating normality is obtained.

When responses indicating normality stop being obtained from the second gateway device 40 (session SS12), the terminal 10 determines that a malfunction has occurred in the second gateway device 40. Additionally, the terminal 10 exchanges information regarding terminal capabilities with plurality of terminals 20.

Specifically, the terminal 10 exchanges information regarding terminal capabilities with the plurality of terminals 20 by using the H.245 protocol for exchanging information regarding each others' terminal capabilities. Additionally, the terminal 10 selects, from among the plurality of terminals 20 and the terminal 10, on the basis of the remaining battery levels, the radio signal states and the like, the terminal that is the most suitable for serving as a substitute device for the second gateway device 40 (session SS13). In the present embodiment, the terminal 10 is selected as the substitute device for the second gateway device 40. There is no limitation to this example, and it is possible to select any of the terminals 20 as the substitute device for the second gateway device 40. When a terminal 20 is selected, the selected terminal 20 performs the same process as that performed by the terminal 10, described below.

The terminal 10 instructs the first gateway device 30 and the bypassing relay device 50 to switch the relay path (session SS14).

Due to this instruction, the first gateway device 30 relays connection information allocation requests and responses to said allocation requests between the terminal (e.g., the terminal 100) that made the allocation request and the terminal 10, which is the substitute device for the second gateway device 40. Additionally, the first gateway device 30 relays requests and confirmations, used for authenticating the terminal 100 that made the connection information allocation request, between the authentication server 60 and the terminal 10, which is the substitute device for the second gateway device 40. Furthermore, the first gateway device 30 relays data for the external communication network from the terminal 100 that made the allocation request, via the terminal 10 that is the substitute device for the second gateway device 40, to the bypassing relay device 50.

The bypassing relay device 50, upon receiving the instruction to switch the relay path from the terminal 10, relays not only data for the external communication network, but also requests and confirmations, used for authenticating the terminal 100 that made the allocation request, between the first gateway device 30 and the authentication server 60.

Furthermore, the terminal 10 confirms the normality of the authentication server 60 (session SS15) via the first gateway device 30 and the bypassing relay device 50. In this case, it will be assumed that the authentication server 60 is able to confirm normality.

As a result of the above-mentioned process, the terminal 100 is able to carry out data communications in the following manner.

Upon being newly incorporated into the communication system 1, the terminal 100 issues, to the first gateway device 30, a request for allocation of connection information to the external communication network 70. The first gateway device 30 forwards the allocation request from the terminal 100 to the terminal 10 functioning as the substitute device for the second gateway device 40 (session SS16). In other words, the first gateway device 30 transfers the allocation request from the terminal 100 to the terminal 10.

The terminal 10, serving as a substitute device for the second gateway device 40, requests authentication from the authentication server 60 via the first gateway device 30 and the bypassing relay device 50. Furthermore, the terminal 10 confirms that the terminal 100 is a terminal that can be connected to the external communication network 70 (session SS17).

After the authentication process for the terminal 100, the terminal 10, serving as the substitute device for the second gateway device 40, allocates to the terminal 100 an IP address, a DNS address or the like for use when the terminal 100 connects to the external communication network 70. The terminal 10 notifies the terminal 100 of said IP address or the like via the first gateway device 30 (session SS18).

The terminal 100 uses the provided information such as the IP address to connect to the external communication network 70 via the first gateway device 30, the terminal 10, the first gateway device 30 and the bypassing relay device 50 (session SS19). In this case, the terminal 10 functions as the substitute device for the second gateway device 40. The terminal 10 may, for example, convert a local IP address from the first gateway device 30 to a global IP address, and connect to the external communication network 70, once again via the first gateway device 30.

Thus, according to the present embodiment, when a malfunction occurs in the second gateway device 40 and an authentication request cannot be made to the authentication server 60, the communication system 1 makes the terminal 10 carry out substitute processing functions for the second gateway device 40, and switches a relay path of the first gateway device 30 and the bypassing relay device 50. As a result thereof, the communication system 1 is able to carry out an authentication process, even for the newly incorporated terminal 100. The terminal 100 is then able to carry out data communications.

Figure 5:
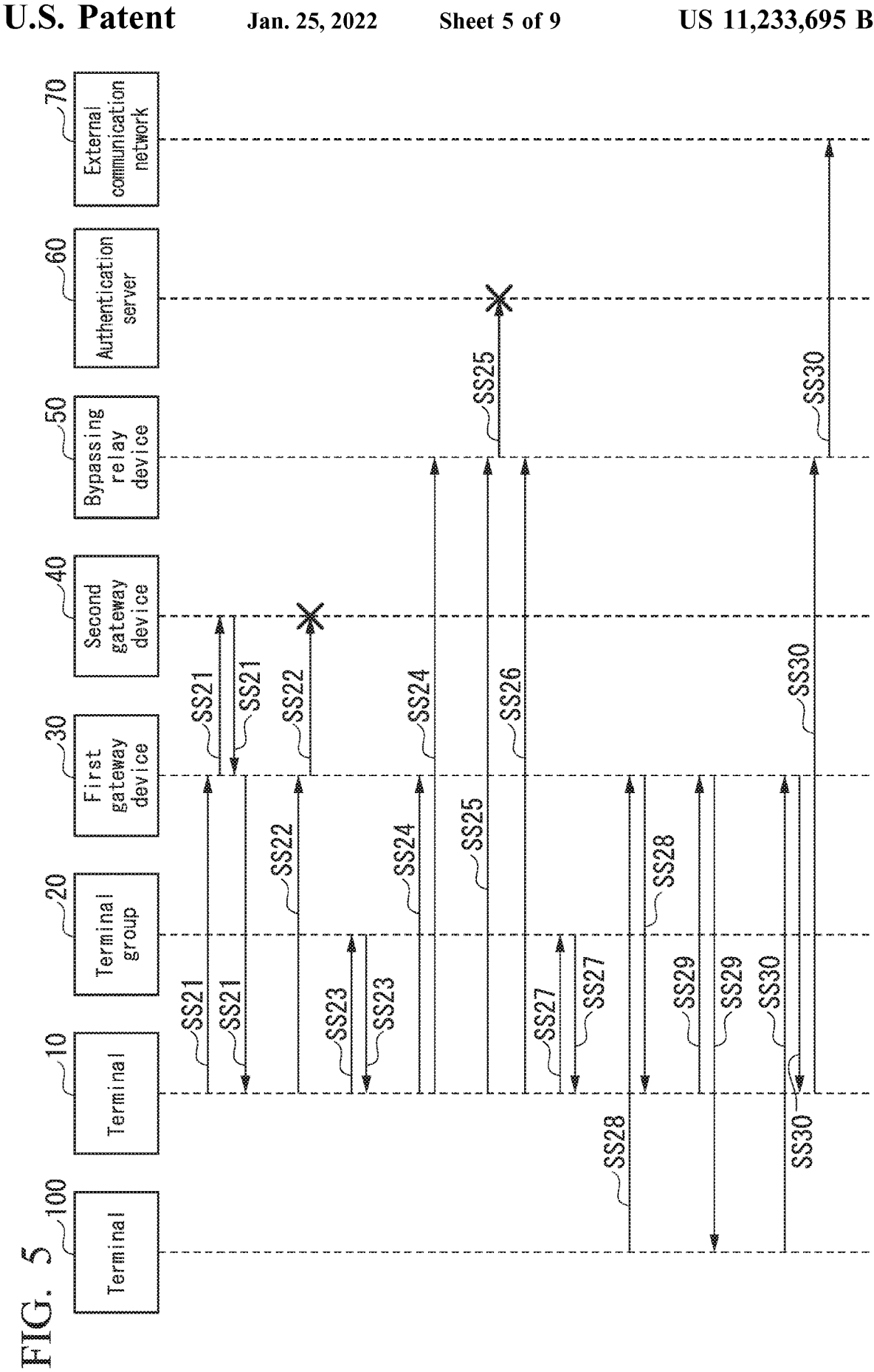
FIG. 5 is a diagram illustrating the flow of an operating procedure when a malfunction occurs in a second gateway device and an authentication server in a communication system.

FIG. 5 is a diagram illustrating the flow of an operating procedure when a malfunction occurs in the second gateway device and the authentication server in the communication system. In sessions SS21 to SS24 in FIG. 5, the same processes as those in sessions SS11 to SS14 in FIG. 4 are performed. Thus, the explanation will begin at session SS25.

The terminal 10 confirms the normality of the authentication server 60 (session SS25) via the first gateway device 30 and the bypassing relay device 50. The terminal 10 sends inquiries to the authentication server 60, and when a response indicating normality is not obtained from the authentication server 60, the following process is carried out. As a result thereof, the terminal 10 functions as a substitute device for the authentication server 60.

The terminal 10 issues a relay path switching instruction to the bypassing relay device 50 (session SS26). Furthermore, the terminal 10 collects authentication information from all of the terminals 20 and the terminal 10 (session SS27). The authentication information is information used for authentication.

As a result of the above-mentioned process, even when a malfunction occurs in the second gateway device 40 and the authentication server 60, the terminal 100 is able to carry out data communications in the following manner.

Upon being newly incorporated into the communication system 1, the terminal 100 issues, to the first gateway device 30, a request for allocation of connection information to the external communication network 70. The first gateway device 30 forwards the allocation request from the terminal 100 to the terminal 10 functioning as the substitute device for the second gateway device 40 and the authentication server 60 (session SS28). In other words, the first gateway device 30 transfers the allocation request from the terminal 100 to the terminal 10.

The terminal 10, serving as a substitute device for the authentication server 60, uses collected authentication information to confirm that the terminal 100 that made the allocation request is a terminal that can be connected to the external communication network 70.

Furthermore, the terminal 10, serving as the substitute device for the second gateway device 40, allocates an IP address, a DNS address or the like for use when the terminal 100 connects to the external communication network 70. The terminal 10 notifies the terminal 100 of said IP address or the like via the first gateway device 30 (session SS29).

The terminal 100 uses the allocated IP address or the like to connect to the external communication network 70 via the first gateway device 30, the terminal 10, the first gateway device 30 and the bypassing relay device 50 (session SS30).

Thus, according to the present embodiment, when a malfunction occurs in the second gateway device 40 and the authentication server 60, the communication system 1 makes the terminal 10 carry out substitute processing functions for the second gateway device 40 and the authentication server 60. Additionally, the communication system 1 switches the relay path of the first gateway device 30 and the bypassing relay device 50. In this case, it is possible to carry out the authentication process because the terminal 10 has collected authentication information from all of the terminals 20, 100 beforehand. As a result thereof, the communication system 1 is able to carry out an authentication process for the newly incorporated terminal 100, and is then able to carry out data communications.

Figure 6:
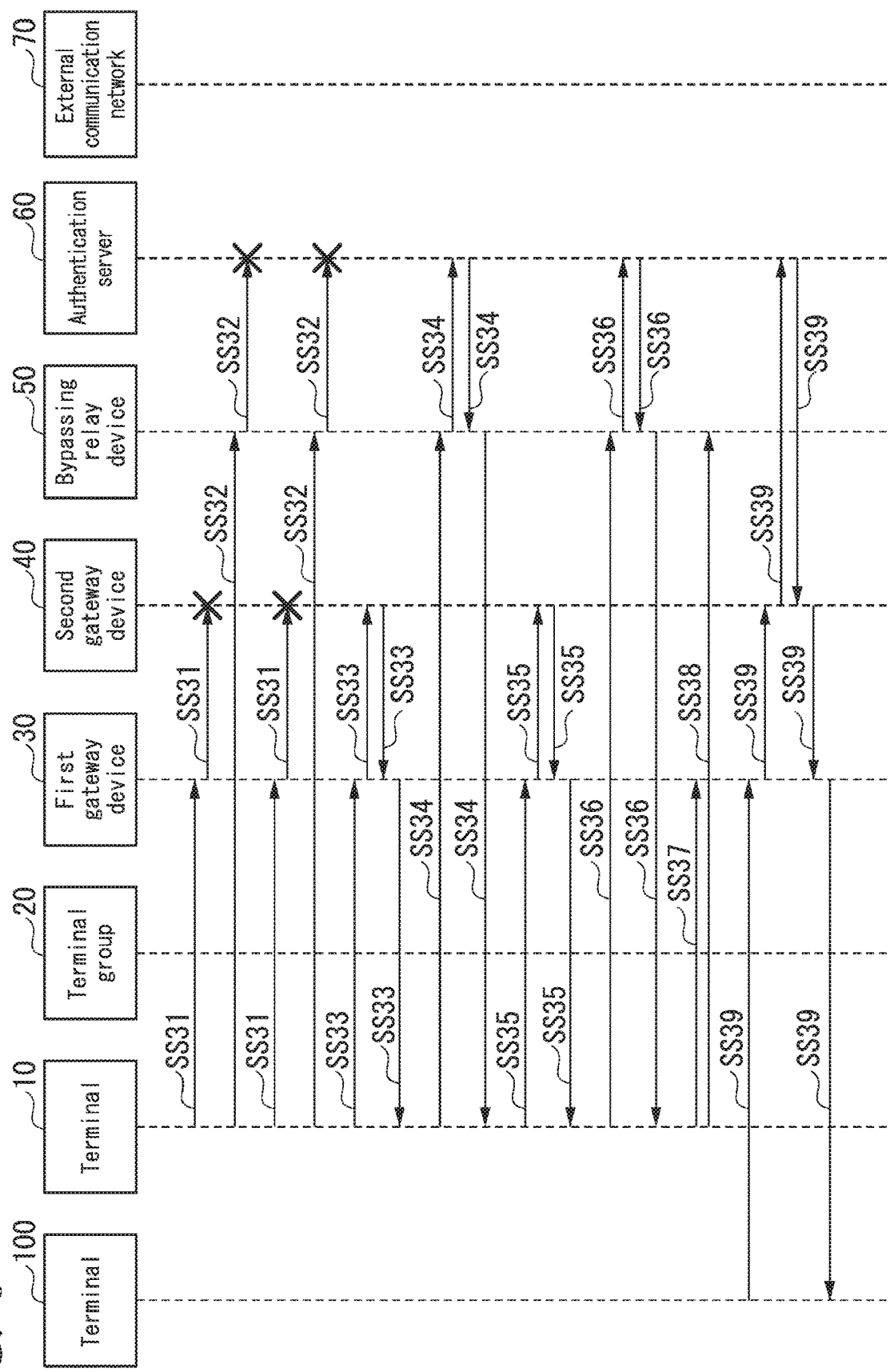
FIG. 6 is a diagram illustrating the flow of an operating procedure in a communication system when a second gateway device and an authentication server have recovered.

FIG. 6 is a diagram illustrating the flow of an operating procedure in the communication system when the second gateway device and the authentication server have recovered.

The terminal 10 confirms the normality of each of the second gateway device 40 and the authentication server 60 while functioning as a substitute device for the second gateway device 40 and the authentication server 60. Specifically, the terminal 10 sends inquiries to the second gateway device 40 and the authentication server 60. The terminal 10 periodically repeats the inquiries until responses indicating normality are returned (sessions SS31 and SS32).

Upon receiving responses indicating normality from the second gateway device 40 and the authentication server 60 (sessions SS33 and SS34), the terminal 10 performs the next process towards full recovery.

The terminal 10 notifies the second gateway device 40, via the first gateway device 30, of information on the execution contents of second gateway device 40 substitution processes. Thereafter, the terminal 10 receives a reception notification from the second gateway device 40 (session SS35).

Furthermore, the terminal 10 notifies the authentication server 60, via the bypassing relay device 50, of the information on the execution contents of authentication server 60 substitution processes (NAT operation, authentication operation or the like). Thereafter, the terminal 10 receives a reception notification from the authentication server 60 (session SS36).

The terminal 10, after confirming that the second gateway device 40 and the authentication server 60 have recovered, cancels the switching of the relay path of the first gateway device 30 and the bypassing relay device 50 (sessions SS37 and SS38). As a result thereof, the first gateway device 30 and the bypassing relay device 50 are switched so as to carry out normal data communications.

As a result of the above-described processes, the communication system 1 returns to the state that it was in before the malfunctions occurred in the second gateway device 40 and the authentication server 60.

Therefore, upon being newly incorporated into the communication system 1, the terminal 100 requests allocation of connection information in the same manner as in sessions SS1 to SS3 in FIG. 3, and thereafter, receives notification of the allocated connection information (session SS39). As a result thereof, the terminal 100 is able to carry out data communications with the external communication network 70.

Thus, according to the present embodiment, when the second gateway device 40 and the authentication server 60 have recovered, the terminal 10 notifies each of the second gateway device 40 and the authentication server 60 of information obtained as a result of executing the substitution process. Due thereto, the second gateway device 40 and the authentication server 60 can take over the information that was generated during the malfunction. As a result thereof, the communication system 1 has no inconsistencies (contradictions) in the information before and after recovery of the second gateway device 40 and the authentication server 60, thereby allowing data communications to be continued without being affected by the occurrence of the malfunction and the recovery.

Figure 7:
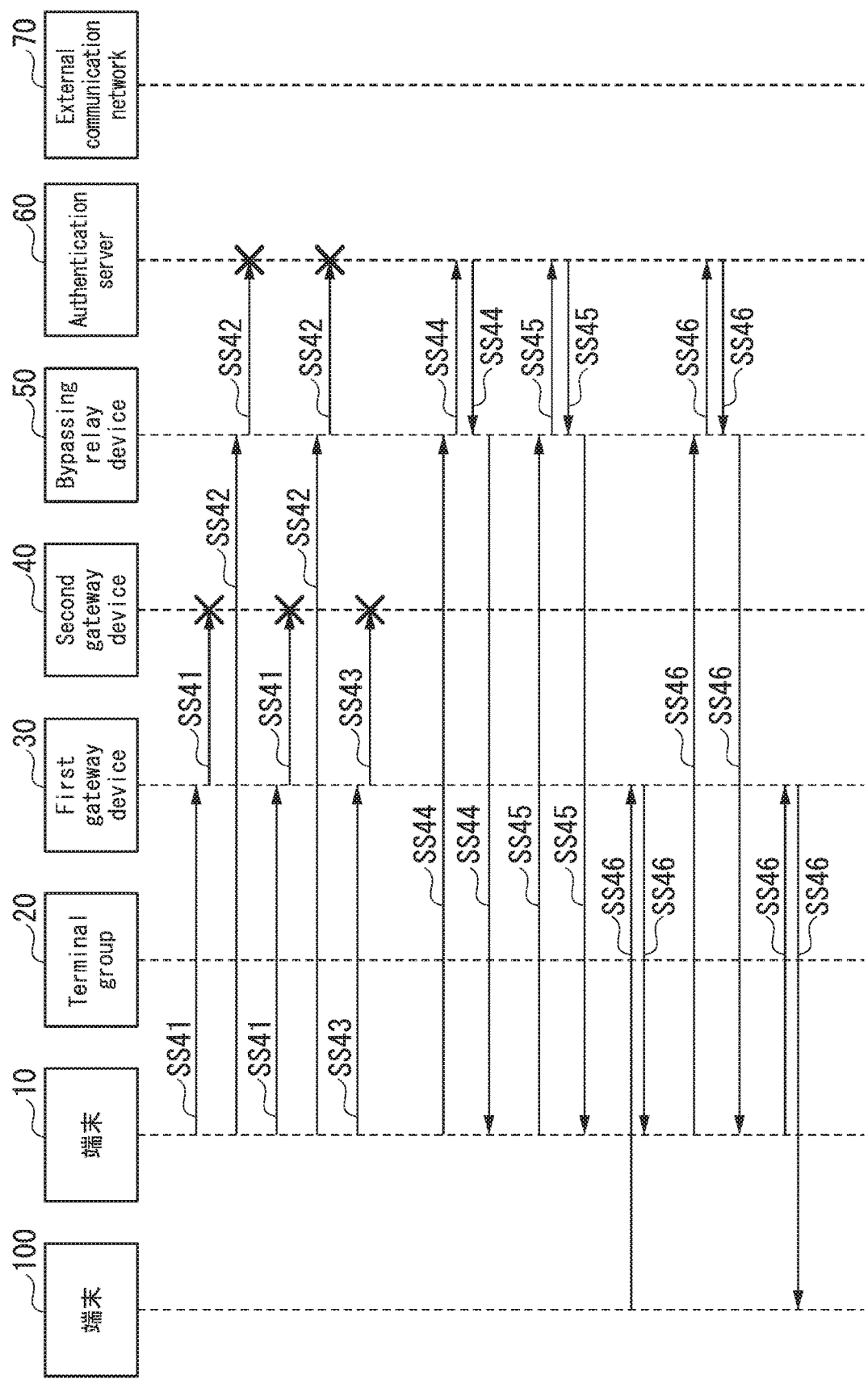
FIG. 7 is a diagram illustrating the flow of an operating procedure in a communication system 1 when an authentication server recovers while a second gateway device is still in a malfunction state.

FIG. 7 is a diagram illustrating the flow of an operating procedure in the communication system 1 when the authentication server recovers while the second gateway device is still in a malfunction state.

The terminal 10 sends inquiries to the second gateway device 40 and the authentication server 60. The terminal 10 periodically repeats the inquiries until responses indicating normality are returned (sessions SS41 and SS42).

In the example shown in FIG. 7, a response indicating normality is not returned from the second gateway device 40 to the terminal 10 (session SS43), but a response indicating normality is returned from the authentication server 60 (session SS44). In this case, the terminal 10 performs the following process.

The terminal 10 notifies the authentication server 60 of information on the execution contents of authentication server 60 substitution processes, and thereafter receives a reception notification (session SS45).

After confirming the recovery of the authentication server 60, the terminal 10 stops functioning as a substitute device for the authentication server 60. For this reason, when a connection information allocation request is received via the first gateway device 30, the terminal 10 sends, via the first gateway device 30 and the bypassing relay device 50, a request for the recovered authentication server 60 to perform the authentication.

As a result of the above-described processes, the communication system 1 returns to the state in which there is a malfunction in only the second gateway device 40.

Upon being newly incorporated into the communication system 1, the terminal 100 requests allocation of connection information in the same manner as in sessions SS16 to SS18 in FIG. 4, and thereafter, receives notification of the allocated connection information (session SS46). As a result thereof, the terminal 100 is able to carry out data communications with the external communication network 70.

Thus, according to the present embodiment, when the authentication server 60 has recovered, the terminal 10 notifies the authentication server 60 of information resulting from the execution of the substitution processes. Due thereto, the authentication server 60 can take over the information during the malfunction. As a result thereof, the communication system 1 has no inconsistencies (contradictions) in the information before and after recovery of the authentication server 60, thereby allowing data communications to be continued without being affected by the occurrence of the malfunction and the recovery.

Figure 8:
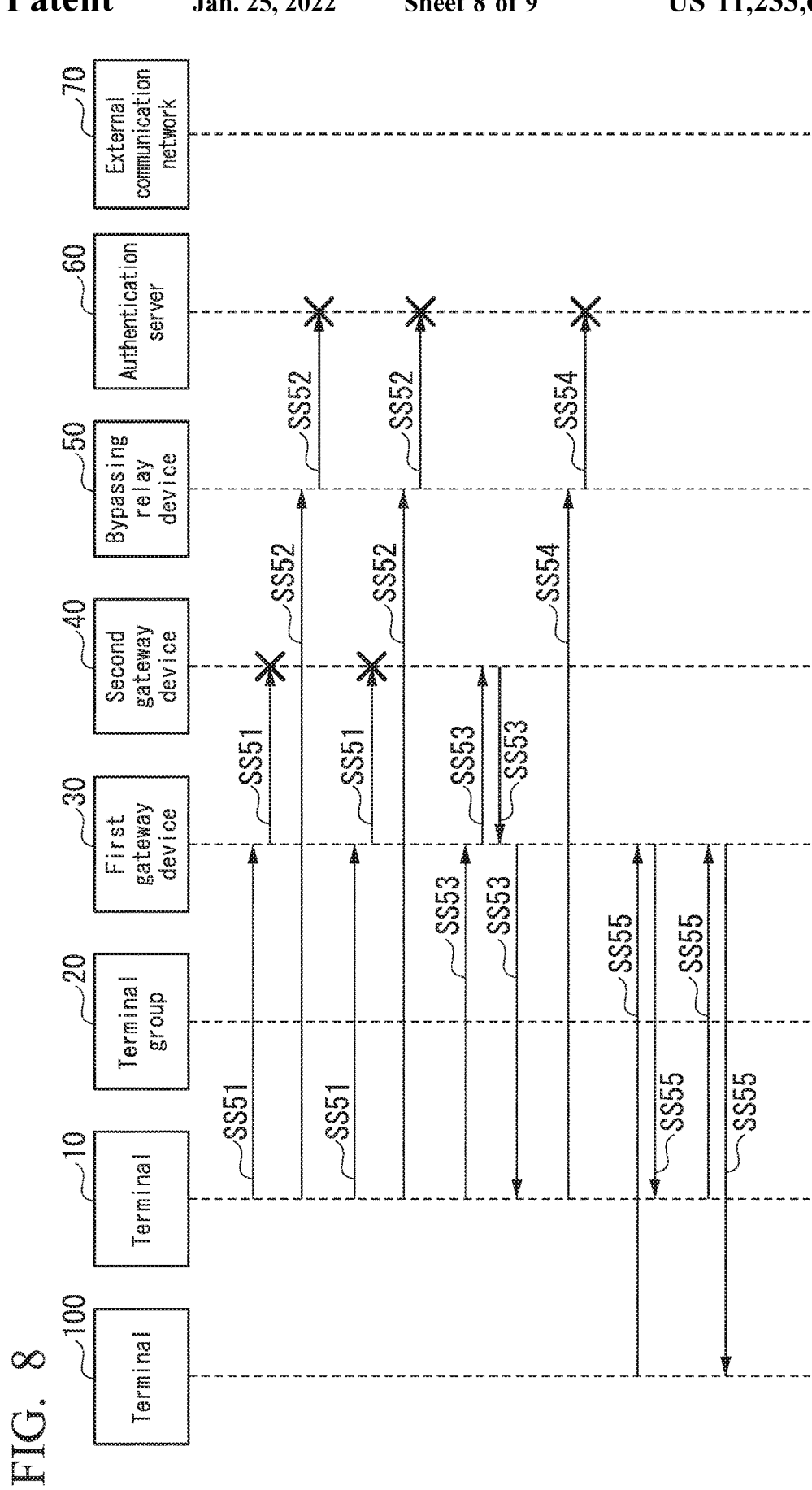
FIG. 8 is a diagram illustrating the flow of an operating procedure in a communication system 1 when a second gateway device recovers while an authentication server is still in a malfunction state.

FIG. 8 is a diagram illustrating the flow of an operating procedure in the communication system 1 when the second gateway device recovers while the authentication server is still in a malfunction state.

The terminal 10 sends inquiries to the second gateway device 40 and the authentication server 60. The terminal 10 periodically repeats the inquiries until responses indicating normality are returned (sessions SS51 and SS52).

In the example shown in FIG. 8, a response indicating normality is returned from the second gateway device 40 to the terminal 10 (session SS43), but a response indicating normality is not returned from the authentication server 60 (session SS54). In this case, the terminal 10 performs the same process as that performed when malfunctions have occurred in the second gateway device 40 and the authentication server 60.

In other words, when the terminal 100 is newly incorporated into the communication system 1, the same processes as those in sessions SS28 and SS29 in FIG. 5 are performed. The terminal 100 makes a connection information allocation request, and thereafter receives a notification of allocated connection information (session SS55), thereby making it possible to carry out data communications with the external communication network 70. Thus, even when the second gateway device 40 has recovered, the terminal 10 performs substitute processing for the second gateway device 40 if the authentication server 60 is still in the malfunction state.

While an embodiment has been explained in detail by referring to the drawings above, the specific configuration need not be limited to that described above, and it is possible to make various design modifications and the like.

In the above-described embodiment, the terminal 10 functions as a substitute device for the second gateway device 40 and the authentication server 60, but it need not be limited in this manner. For example, if the terminal 10, while serving as a substitute device for the authentication server 60, becomes unsuitable for serving as a substitute device for the authentication device 60 due to a reason such as reduced battery voltage, then another terminal 20 may serve as the substitute device for the authentication server 60 instead of the terminal 10. Additionally, it may be arranged, from the beginning, for the terminal 10 to serve as a substitute device for the second gateway device 40, and for a terminal 20 having the same structure as the terminal 10 to serve as a substitute device for the authentication server 60.

Additionally, while the terminal 10 requested authentication to the authentication server 60, which is connected to the external communication network 70, via the first gateway device 30 and the bypassing relay device 50 as a substitute process for the second gateway device 40, the route need not be limited to the above. For example, the terminal 10 may request authentication to the authentication server 60 connected to the external communication network 70 via the first gateway device 30, the bypassing relay device 50, and further via another external communication network.

[Basic Structure]

Figure 9:
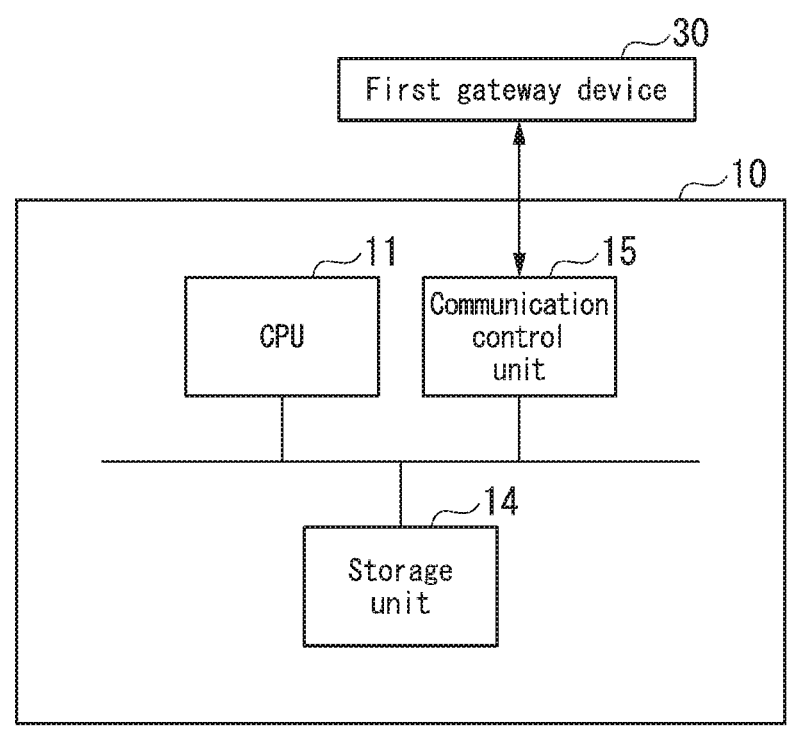
FIG. 9 is a schematic block diagram illustrating the basic structure of a terminal.

FIG. 9 is a schematic block diagram illustrating the basic structure of a terminal.

The terminal 10 comprises a CPU 11, a storage unit 14 and a communication control unit 15.

The CPU 11 sends inquiries to the second gateway device 40 through the communication control unit 15, and determines whether or not the second gateway device 40 is operating normally. When it is determined that the second gateway device 40 is not operating normally, the CPU 11 performs the following process.

The CPU 11 acquires information regarding the terminal capability of being able to execute substitute processes for the second gateway device 40 from plurality of terminals, and stores the acquired data in the storage unit 14. The CPU 11 selects a substitute communication terminal for performing a substitute process for the second gateway device 40 from among the plurality of communication terminals including the terminal 10.

When the terminal 10 is selected as the substitute communication terminal, an instruction for the following process is issued to the first gateway device 30, which is the relay destination of data from the plurality of communication terminals. In other words, the CPU 11 instructs the first gateway device 30 to serve as a relay for exchanging connection information allocation requests and responses to said allocation requests between the terminal 10 and a terminal (for example, the terminal 100) that has made an allocation request. Additionally, the CPU 11 instructs the first gateway device 30 to serve as a relay for sending data regarding authentication of the terminal 100 that made the allocation request between the terminal 10 and the authentication server 60. Furthermore, the CPU 11 instructs the first gateway device 30 to serve as a relay for sending data for the external communication network from the terminal 100 that made the allocation request to the external communication network 70 via the terminal 10.

The CPU 11 instructs the bypassing relay device 50 to serve as a relay between the first gateway device 30 and the authentication server 60 for data relating to authentication as well.

Therefore, even when a malfunction occurs in the second gateway device 40 in the communication system 1, the terminal 10 can, as a substitute process for the second gateway device 40, request that the authentication server 60 authenticate the terminal 100. Due thereto, even when a terminal 100 is newly incorporated into the communication system 1, the terminal 100 is authenticated, so the terminal 100 can carry out data communications.

INDUSTRIAL APPLICABILITY

According to at least one of the above-described embodiments, a communication terminal is able to authenticate new terminals and carry out data communications even when a malfunction occurs and an authentication device cannot perform authentication.

REFERENCE SIGNS LIST

1 Communication system
10, 20, 100 Terminal
11 CPU
12 RAM
13 ROM
14 Storage unit
16 Input/output unit
30 First gateway device
40 Second gateway device
50 Bypassing relay device
60 Authentication server
70 External communication network

The invention claimed is:

1. A communication terminal comprising:
a first normal operation determination unit configured to determine whether or not an external communication network relay device, which requests an authentication device to authenticate communication terminals, is operating normally;
a terminal selection unit configured to, when the first normal operation determination unit determines that the external communication network relay device is not operating normally, select, from among a plurality of communication terminals including the own communication terminal, a substitute communication terminal for executing a first substitute process for the external communication network relay device;
a first instruction unit configured to, when the own communication terminal is selected as the substitute communication terminal, instruct an internal wireless communication network relay device, which is a relay destination for data from the plurality of communication terminals, to perform processes of
relaying a connection information allocation request from a requesting communication terminal and a response to the allocation request between the requesting communication terminal and the own communication terminal,
relaying data relating to authentication of the requesting communication terminal between the own communication terminal and the authentication device, and
relaying data for the external communication network from the requesting communication terminal to the external communication network via the own communication terminal;
a second instruction unit configured to instruct a bypassing relay device that relays the data for the external communication network between the internal wireless communication network relay device and the external communication network to further perform a process of relaying the data relating to authentication between the internal wireless communication network relay device and the authentication device;
a first substitute processing unit configured to, when the connection information allocation request is received from the requesting communication terminal via the internal wireless communication network relay device, perform a first substitute process by requesting the authentication device, via the external communication network, to authenticate the requesting communication terminal, allocating the connection information to the requesting communication terminal that was authenticated by the authentication device, and transmitting the allocated connection information to the requesting communication terminal via the internal wireless communication network relay device;
a second normal operation determination unit configured to determine, via the external communication network, whether or not the authentication device is operating normally;
an authentication information collection unit configured to, when the second normal operation determination unit determines that the authentication device is not operating normally, collect authentication information used in the authentication from the plurality of communication terminals;
a second substitute processing unit configured to, when the connection information allocation request is received from the requesting communication terminal via the internal wireless communication network relay device, perform a second substitute process for the authentication device by authenticating the requesting communication terminal using the authentication information collected by the authentication information collection unit; and
a third substitute processing unit configured to perform the first substitute process by allocating the connection information to the requesting communication terminal authenticated by the second substitute processing unit, and transmitting the allocated connection information to the requesting communication terminal via the internal wireless communication network relay device.

2. A communication terminal comprising:
a first normal operation determination unit configured to determine whether or not an external communication network relay device, which requests an authentication device to authenticate communication terminals, is operating normally;
a terminal selection unit configured to, when the first normal operation determination unit determines that the external communication network relay device is not operating normally, select, from among a plurality of communication terminals including the own communication terminal, a substitute communication terminal for executing a first substitute process for the external communication network relay device;
a first instruction unit configured to, when the own communication terminal is selected as the substitute communication terminal, instruct an internal wireless communication network relay device, which is a relay destination for data from the plurality of communication terminals, to perform processes of
relaying a connection information allocation request from a requesting communication terminal and a response to the allocation request between the requesting communication terminal and the own communication terminal,
relaying data relating to authentication of the requesting communication terminal between the own communication terminal and the authentication device, and relaying data for the external communication network from the requesting communication terminal to the external communication network via the own communication terminal;
a second instruction unit configured to instruct a bypassing relay device that relays the data for the external communication network between the internal wireless communication network relay device and the external communication network to further perform a process of relaying the data relating to authentication between the internal wireless communication network relay device and the authentication device;
a first substitute processing unit configured to, when the connection information allocation request is received from the requesting communication terminal via the internal wireless communication network relay device, perform a first substitute process by requesting the authentication device, via the external communication network, to authenticate the requesting communication terminal, allocating the connection information to the requesting communication terminal that was authenticated by the authentication device, and transmitting the allocated connection information to the requesting communication terminal via the internal wireless communication network relay device;
a second normal operation determination unit configured to determine, via the external communication network, whether or not the authentication device is operating normally;
an authentication information collection unit configured to, when the second normal operation determination unit determines that the authentication device is not operating normally, collect authentication information used in the authentication from the plurality of communication terminals;
an execution result information notification unit configured to, when it is determined that the external communication network relay device and the authentication device are operating normally, notify the external communication network relay device of execution result information for the first substitute process and notify the authentication device of execution result information for a second substitute process that authenticates the requesting communication terminal using the authentication information collected by the authentication information collection unit;
a third instruction unit configured to instruct, to the internal wireless communication network relay device, to perform processes of
relaying the connection information allocation request from the requesting communication terminal and the response to the allocation request between the requesting communication terminal and the external communication network relay device, and
relaying data for the external communication network from the requesting communication terminal to the external communication network via the external communication network relay device; and
a fourth instruction unit configured to instruct, to the bypassing relay device, to perform to stop the relaying the data relating to authentication between the internal wireless communication network relay device and the authentication device.
3. A communication terminal comprising:
a first normal operation determination unit configured to determine whether or not an external communication network relay device, which requests an authentication device to authenticate communication terminals, is operating normally;
a terminal selection unit configured to, when the first normal operation determination unit determines that the external communication network relay device is not operating normally, select, from among a plurality of communication terminals including the own communication terminal, a substitute communication terminal for executing a first substitute process for the external communication network relay device;
a first instruction unit configured to, when the own communication terminal is selected as the substitute communication terminal, instruct an internal wireless communication network relay device, which is a relay destination for data from the plurality of communication terminals, to perform processes of
relaying a connection information allocation request from a requesting communication terminal and a response to the allocation request between the requesting communication terminal and the own communication terminal,
relaying data relating to authentication of the requesting communication terminal between the own communication terminal and the authentication device, and
relaying data for the external communication network from the requesting communication terminal to the external communication network via the own communication terminal;
a second instruction unit configured to instruct a bypassing relay device that relays the data for the external communication network between the internal wireless communication network relay device and the external communication network to further perform a process of relaying the data relating to authentication between the internal wireless communication network relay device and the authentication device;
a first substitute processing unit configured to, when the connection information allocation request is received from the requesting communication terminal via the internal wireless communication network relay device, perform a first substitute process by requesting the authentication device, via the external communication network, to authenticate the requesting communication terminal, allocating the connection information to the requesting communication terminal that was authenticated by the authentication device, and transmitting the allocated connection information to the requesting communication terminal via the internal wireless communication network relay device;
a second normal operation determination unit configured to determine, via the external communication network, whether or not the authentication device is operating normally;
an authentication information collection unit configured to, when the second normal operation determination unit determines that the authentication device is not operating normally, collect authentication information used in the authentication from the plurality of communication terminals;
an execution result information notification unit configured to, when it is determined that the authentication device is operating normally, notify the authentication device of execution result information for a second substitute process that authenticates the requesting communication terminal using the authentication information collected by the authentication information collection unit; and a fourth substitute processing unit configured to, when the connection information allocation request is received from the requesting communication terminal via the internal wireless communication network relay device, perform the first substitute process by requesting the authentication device that received the notification of the execution result information via the external communication network to authenticate the requesting communication terminal, allocating the connection information to the requesting communication terminal that was authenticated by the authentication device, and transmitting the allocated connection information to the requesting communication terminal via the internal wireless communication network relay device.

4. A communication system comprising:

a plurality of communication terminals;

an internal wireless communication network relay device, which is a relay destination for data from the plurality of communication terminals;

an external communication network relay device configured to, when a connection information allocation request is received from a requesting communication terminal via the internal wireless communication network relay device, request an authentication device to authenticate the requesting communication terminal, allocate the connection information to the authenticated requesting communication terminal, and transmit the allocated connection information to the authenticated requesting communication terminal via the internal wireless communication network relay device; and a bypassing relay device configured to relay data for the external communication network, from the requesting communication terminal that used the allocated connection information, between the internal wireless communication network relay device and the external communication network;

wherein at least one of the plurality of communication terminals is a communication terminal, and the communication terminal comprises:

a first normal operation determination unit configured to determine whether or not an external communication network relay device, which requests an authentication device to authenticate communication terminals, is operating normally;

a terminal selection unit configured to, when the first normal operation determination unit determines that the external communication network relay device is not operating normally, select, from among a plurality of communication terminals including the own communication terminal, a substitute communication terminal for executing a first substitute process for the external communication network relay device;

a first instruction unit configured to, when the own communication terminal is selected as the substitute communication terminal, instruct an internal wireless communication network relay device, which is a relay destination for data from the plurality of communication terminals, to perform processes of relaying a connection information allocation request from a requesting communication terminal and a response to the allocation request between the requesting communication terminal and the own communication terminal, relaying data relating to authentication of the requesting communication terminal between the own communication terminal and the authentication device, and relaying data for the external communication network from the requesting communication terminal to the external communication network via the own communication terminal; and a second instruction unit configured to instruct a bypassing relay device that relays the data for the external communication network between the internal wireless communication network relay device and the external communication network to further perform a process of relaying the data relating to authentication between the internal wireless communication network relay device and the authentication device.

5. A communication terminal control method comprising steps of:

determining whether or not an external communication network relay device, which requests an authentication device to authenticate communication terminals, is operating normally;

when it is determined that the external communication network relay device is not operating normally, selecting, from among a plurality of communication terminals including a own communication terminal, a substitute communication terminal for executing a first substitute process for the external communication network relay device;

when the own communication terminal is selected as the substitute communication terminal, instructing an internal wireless communication network relay device, which is a relay destination for the plurality of communication terminals, to perform processes of relaying a connection information allocation request from a requesting communication terminal and a response to the allocation request between the requesting communication terminal and the own communication terminal, relaying data relating to authentication of the requesting communication terminal between the own communication terminal and the authentication device, and relaying data for the external communication network from the requesting communication terminal to the external communication network via the own communication terminal;

instructing a bypassing relay device that relays the data for the external communication network between the internal wireless communication network relay device and the external communication network to further perform a process of relaying the data relating to authentication between the internal wireless communication network relay device and the authentication device;

performing, when the connection information allocation request is received from the requesting communication terminal via the internal wireless communication network relay device, a first substitute process by requesting the authentication device, via the external communication network, to authenticate the requesting communication terminal, allocating the connection information to the requesting communication terminal that was authenticated by the authentication device, and transmitting the allocated connection information to the requesting communication terminal via the internal wireless communication network relay device;

determining, via the external communication network, whether or not the authentication device is operating normally;

collecting, when it is determined that the authentication device is not operating normally, authentication information used in the authentication from the plurality of communication terminals;

performing, when the connection information allocation request is received from the requesting communication terminal via the internal wireless communication network relay device, a second substitute process for the authentication device by authenticating the requesting communication terminal using the collected authentication information; and performing the first substitute process by allocating the connection information to the requesting communication terminal authenticated in the second substitute process, and transmitting the allocated connection information to the requesting communication terminal via the internal wireless communication network relay device.

* * * * *